United States Patent [19]

Carlstedt

[11] 4,203,843
[45] May 20, 1980

[54] COALESCENCE SYSTEM

[75] Inventor: Bo R. Carlstedt, Hölö, Sweden

[73] Assignee: Ingenjorsfirman Orrje & Co AB, Stockholm, Sweden

[21] Appl. No.: 28,950

[22] Filed: Apr. 11, 1979

[30] Foreign Application Priority Data

Apr. 18, 1978 [SE] Sweden ................................. 7804394

[51] Int. Cl.² ............................................. B01D 29/00
[52] U.S. Cl. .................................... 210/262; 210/265; 210/266; 210/293; 210/DIG. 5
[58] Field of Search ................... 210/23 R, 43, 73 W, 210/259, 262, 265, 266, 294, 289, 291, 293

[56] References Cited

U.S. PATENT DOCUMENTS

| | | | |
|---|---|---|---|
| 3,265,212 | 8/1966 | Bonsall | 210/259 |
| 3,830,371 | 8/1974 | Garcia | 210/265 |

*Primary Examiner*—Charles N. Hart
*Assistant Examiner*—Ernest G. Therkorn
*Attorney, Agent, or Firm*—Pollock, Vande Sande and Priddy

[57] ABSTRACT

The invention refers to a device for separation of two liquids in a common mixture from each other, said liquids having different densities and being non-soluble in each other. The device comprises a pressure-tight vessel, which contains a charge of a high-porous material, which is resistant to the mixed liquids to be separated and has a high surface ratio and small flow resistance. The liquid mixture is introduced under pressure through at least one inlet conduit into a chamber located within the charge in the vessel but free from the charge material, an outlet for the heavier liquid being disposed in the bottom of the vessel in order to bring said liquid to flow substantially vertically and downwardly through the vessel, after which the two liquids each are carried to an individual spillway. The invention is distinguished in that the mixture introduction chamber is disposed on the vertical center axis of the separation vessel and below the top of the charge of material therein, and in that the outlet for the lighter liquid is located at the crown of said separation vessel so that also the lighter liquid is brought to flow vertically, namely upwardly, and in that in the inlet conduit for the mixture is connected upstream of the separation vessel and at substantially the same level as the latter a coarse-separation tank which at its crown has a communicating connection to the uppermost portion of the separation vessel and which is adapted to be entirely liquid-filled and house within iself a border surface between the heavier and the lighter liquid while providing for an introductory coarse-separation thereof, the spillways for the separated liquids being disposed on at least some distance above the crown of the separation vessel.

2 Claims, 1 Drawing Figure

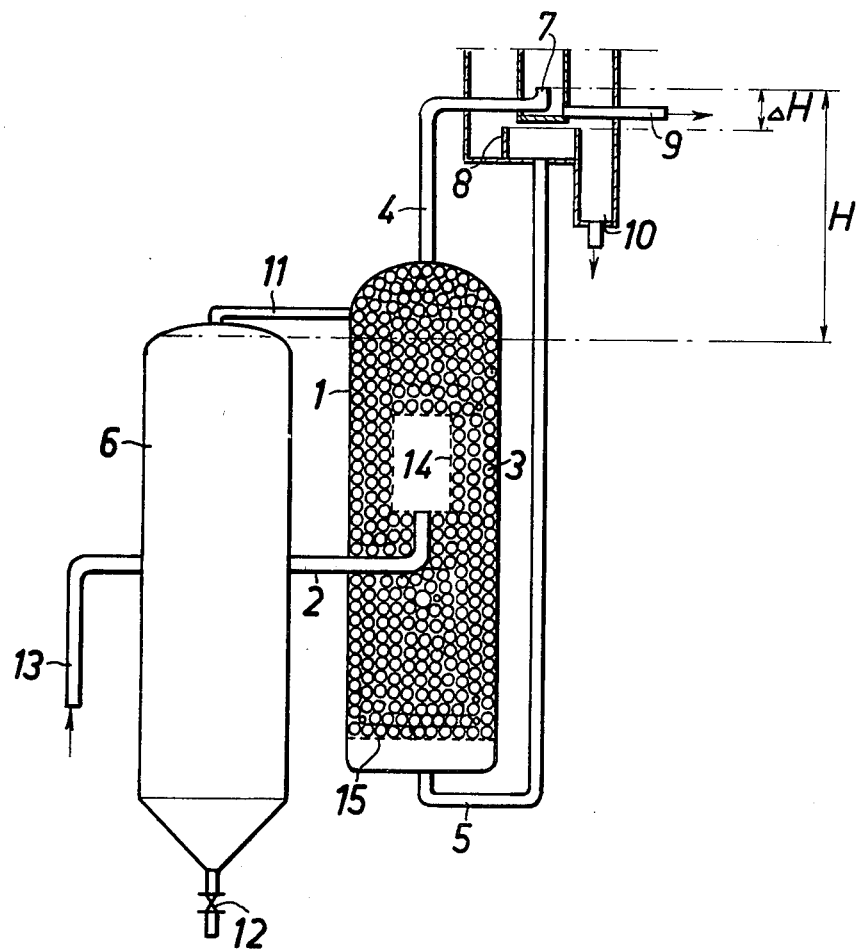

COALESCENCE SYSTEM

The present invention refers to a device for separation of two liquids in a common mixture from each other, said liquids having different densities and being non-soluble in each other, said device comprising a pressure-tight vessel, which contains a charge of a high-porous material, which is resistant to the mixed liquids to be separated and has a high surface ratio (i.e. great surface area per volume unit) and small flow resistance, into which vessel the liquid mixture through at least one inlet conduit is to be introduced under pressure into a chamber located within the charge in the vessel but free from the charge material, an outlet for the heavier liquid being disposed in the bottom of the vessel in order to bring said liquid to flow substantially vertically and downwardly through the vessel, after which the two liquids each are carried to an individual spillway.

Liquid separation according to this principle was suggested several years ago in the Swedish Pat. No. 316,148. In doing so it was utilized the condition known from nature that a lighter liquid spreads in a capillary zone on top of the surface of a heavier liquid. In practice there has been utilized a tank comprising a charge of particulate liquid-resistant material to which is supplied the mixture of a heavier and a lighter liquid to be separated. Adjacent to the tank is arranged a collecting well with spillway for the heavier liquid and said well communicates with the interior of the tank at the bottom of the latter for defining a zero pressure surface in the charge. In or at the charge there is also arranged a trap for the lighter liquid, said trap also having a spillway but at a higher level than the first-mentioned spillway. Practical tests then indicated that in certain cases of application said device suffered from drawbacks, particularly in case the separation device was used aboard ships navigating off shore but also when the separation device as far as levels are concerned for space reasons had to be located above the discharge level for the mixture of liquids as well as below the level of the receiver of the heavier and the lighter liquid, respectively, after separation. In this case three pumps are required, namely one for the mixture and one for each of the separated liquids. Furthermore this device required great precision in manufacture of the components for being able to operate satisfactorily.

For greater heel angles of the ship the spillways caused problem and therefore there is a need for an improvement of the device also in this respect.

In a later step of development said device has been designed as a covered or closed container to which the liquid mixture was supplied under pressure. In doing so the drawback of three pumps being required could be eliminated and instead only one pump was utilized but it turned out to be accompanied by difficulties to control the separation of the two liquids in a sufficiently careful way and at a satisfying rate dependent upon their density and viscosity relations. In an attempt to provide for a better control of the separation course and accelerate the same trials were made to install valves in the outlet conduit for the respective separated liquids and owing thereto certain improvements were achieved. For controlling said valves there were required some kind of control means in which malfunctions may occur, however. It has now turned out that by certain structural measures an essential improvement of the operation of the device can be obtained and the above-stated drawbacks eliminated. Thus the main object of the present invention is to provide a device with provides for a good operational control of the separation procedure as well as high efficiency thereof without requiring any valves in the outlet conduits but only by utilizing a suitable dimensioning of the piping.

According to the present invention this is obtained substantially in that the mixture introduction chamber is disposed on the vertical center axis of the separation vessel and below the top of the charge of material therein, namely particularly at about the upper third of the height of the vessel, and in that the outlet for the lighter liquid is located at the crown of said separation vessel so that also the lighter liquid is brought to flow vertically, namely upwardly, and in that in the inlet conduit for the mixture is connected upstream of the separation vessel and at substantially the same level as the latter a coarse separation tank which at its crown has a communicating connection to the uppermost portion of the separation vessel and which is adapted to be entirely liquid-filled and house within itself a border surface between the heavier and the lighter liquid while providing for an introductory coarse-separation thereof, the spillways for the separated liquids being disposed on at least some distance above the crown of the separation vessel.

The device according to the present invention also can be easily provided with an integrated coaxial spillway device which is much less sensible to heeling when navigating off shore.

By way of example, the invention will further described below with reference to the accompanying diagrammatical drawing.

In the drawing is illustrated in longitudinal section a separation vessel 1 which is closed and pressure-tight and up to the crown filled with a charge of a highly porous material 3 resistant to the liquids in the mixture to be separated. Preferably, said material is to have a high surface ratio, i.e. great surface area per volume unit, and low resistance to flow. From the crown of the vessel 1, an outlet conduit 4 for the lighter liquid in the mixture extends to a spillway device 7,8. From the bottom of the vessel 1 extends an outlet conduit 5 for the heavier liquid in the mixture, and said conduit also extends to the spillway device 7,8 which is to be disposed at a level at least at some distance above the crown of the vessel 1.

For introduction of the liquid mixture to be separated into the separation vessel 1 is within the charge of material 3 and preferably at the upper third of the height of said vessel 1 arranged a space or chamber 14 free from said charge material 3 and the liquid mixture is supplied to said chamber 14 under pressure through at least one inlet conduit 2. For delimiting the chamber 14 from the surronding charge of material 3 said chamber might be bound by suitable apertured or perforated or grated walls and roof and a bottom which usually is imperforate but might be apertured, if desired. In order to provide the largest possible outlet surface for the heavier liquid in the vessel bottom the charge material 3 there is located on an apertured or perforated or grated bottom wall 15 at a short distance above the bottom of the vessel 1.

According to the invention a coarse separation tank 6 is mounted in the inlet conduit 2 upstream the separation vessel 1 and substantially at the same level as the latter. At its own crown said tank has a communicating connection 11 to the upper portion of the separation vessel 1 at a position above the intended uppermost level of the border surface between the lighter and the heavier liquid within the charge material 3 in the vessel 1. Owing to the fact that the coarse separation tank 6 is to be entirely filled with liquid and communicates with the vessel 1 through conduits 2 and 11 a border surface between the lighter and the heavier liquid will be present also within said coarse separation tank 6. This implies i.a. the advantage that it will be easy to provide a reliably operating float-actuated control valve (not illustrated) in the coarse separation tank 6, since the float therein then will detect the same border surface level between the lighter and heavier liquid as in the separation vessel 1. Another advantage of this arrangement is that the main portion of the lighter liquid will be separated already when the mixture of liquid is introduced in said tank 6 at a position at about half the height thereof, for instance through a conduit 13.

Although the spillway device 7, 8 might be carried out in a well-known way previously known it has been illustrated in the drawing in the form of two coaxially arranged spillways, namely one spillway 7 for the lighter liquid and one surrounding spillway 8 for the heavier liquid. Thereby the spillway 7 for the lighter liquid will be located at a distance ΔH above the level of the spillway 8 for the heavier liquid. Due to the coaxial mounting of said two spillways there is achieved a great insensibility to great inclinations of the spillway device of up to 30° to a vertical axis. From the spillway 7 for the lighter liquid an outlet pipe 9 leads to some suitable place for collection, however not further illustrated, while from the spillway 8 for the heavier liquid an outlet pipe 10 in a similar manner leads to a suitable place for collection.

The device according to the present invention is intended to provide separation of any two liquids which have different densities and which are insoluble in each other. The most common application most probably is mixtures of oil and water but also mixtures of cutting or cooling liquids with oil are conceivable.

When starting the operation of the device only the heavier liquid such as water is supplied under pressure through the inlet conduit 2 until said heavier liquid begins to flow over or spill at the spillway 8 for the heavier liquid. After that the supply of the mixture of lighter and heavier liquid, such as oil and water, under pressure can start through the same inlet conduit 2. The lighter liquid, such as oil, which is entrained will then be enriched upwardly from the mixture introduction chamber 14 and depresses downwardly the water which is present in the lighter liquid outlet conduit 4 until the border surface between the two liquids reaches a depth H below the spillway 7 for the lighter liquid, defined by the formula $$(H - \Delta H) \cdot \gamma_v = H \cdot \gamma_o \tag{1}$$

in which

ΔH = the level differential between the spillway 7 for the lighter liquid and the surface for the heavier liquid in the spillway 8 minus the friction losses for the heavier liquid from the mixture introduction chamber 14 to the spillway 8

$\gamma_v$ = density of water $\gamma_o$ = density of oil

The formula 1 can be transferred to $$\Delta H = H(1 - \frac{\gamma_o}{\gamma_v}) \tag{2}$$

For an increase of H above said condition the lighter liquid begins to spill at the spillway 7 for said liquid.

The greater the density of the lighter liquid is, the smaller is ΔH, which however always in its turn is proportional to H. From this follows that the greater H can be selected, the greater is ΔH, which is an advantage from the operational point of view, since the risk for the heavier liquid at any moment to spill over into the spillway 7 for the lighter liquid thus will be reduced.

As is evident from the above-stated the device according to the present invention does not require any valves for its operation but it might be suitable to provide the outlet conduit 5 from the separation vessel 1, for facilitating the draining of the lighter liquid, should this be desired, with a closure valve (not illustrated). Since the coarse separation tank 6 also will provide a sedimentation of sedimentable particles eventually present in the supplied mixture, it might be necessary to provide a drainage valve 12 at the bottom of the coarse separation tank for allowing removal of the sediment.

I claim:

1. A device for separation of two liquids in a common mixture from each other, said liquids having different densities and being non-soluble in each other, said device comprising a pressure-tight vessel, which contains a charge of a high-porous material, which is resistant to the mixed liquids to be separated and has a high surface ratio (i.e. great surface area per volume unit) and small flow resistance, into which vessel the liquid mixture through at least one inlet conduit is to be introduced under pressure into a chamber, located within the charge in the vessel but free from the charge material, an outlet for the heavier liquid being disposed in the bottom of the vessel in order to bring said liquid to flow substantially vertically and downwardly through the vessel, after which the two liquids each are carried to an individual spillway, characterized in that the mixture introduction chamber is disposed on the vertical center axis of the separation vessel and below the top of the charge of material therein, namely particularly at about the upper third of the height of the vessel, and in that the outlet for the lighter liquid is located at the crown of said separation vessel so that also the lighter liquid is brought to flow vertically, namely upwardly, and in that in the inlet conduit for the mixture is connected upstream of the separation vessel and at substantially the same level as the latter a coarse separation tank which at its crown has a communicating connection to the uppermost portion of separation vessel and which is adapted to be entirely liquid-filled and house within itself a border surface between the heavier and the lighter liquid while providing for an introductory coarse-separation thereof, the spillways for the separated liquids being disposed on at least some distance above the crown of the separation vessel.

2. A device according to claim 1, characterized in that the spillway for the lighter liquid is arranged concentrically within the spillway for the heavier liquid.

* * * * *